(12) United States Patent
Xue

(10) Patent No.: US 11,771,055 B2
(45) Date of Patent: Oct. 3, 2023

(54) AUTOMATIC PET FEEDER WITH INTELLIGENT PUSH-PULL AND ANTI-COCKROACH FUNCTIONS

(71) Applicant: Dongguan ZhiYiHong Hardware & Plastic Co., Ltd., Dongguan (CN)

(72) Inventor: Zhiqi Xue, Guangdong (CN)

( * ) Notice: Subject to any disclaimer, the term of this patent is extended or adjusted under 35 U.S.C. 154(b) by 124 days.

(21) Appl. No.: 17/583,145

(22) Filed: Jan. 24, 2022

(65) Prior Publication Data

US 2023/0023816 A1 Jan. 26, 2023

(30) Foreign Application Priority Data

Jul. 26, 2021 (CN) .......................... 202110844302.7

(51) Int. Cl.
*A01K 5/02* (2006.01)
*A01K 5/01* (2006.01)

(52) U.S. Cl.
CPC .............. *A01K 5/0142* (2013.01); *A01K 5/02* (2013.01)

(58) Field of Classification Search
CPC ................................ A01K 5/0142; A01K 5/02
See application file for complete search history.

(56) References Cited

U.S. PATENT DOCUMENTS

| | | | | |
|---|---|---|---|---|
| 4,522,152 A | * | 6/1985 | Meyer | A01K 5/0275 119/56.1 |
| 5,794,560 A | * | 8/1998 | Terenzi | A01K 5/0291 119/51.11 |
| 8,245,665 B2 | * | 8/2012 | Willett | A01K 7/00 119/51.5 |
| 2012/0042831 A1 | * | 2/2012 | Holloway | A01K 5/0225 119/51.01 |
| 2015/0164044 A1 | * | 6/2015 | Powers | A01K 5/0225 119/61.5 |
| 2022/0183253 A1 | * | 6/2022 | Sibbitt | A01K 5/0142 |

FOREIGN PATENT DOCUMENTS

| | | |
|---|---|---|
| CN | 201320357788.2 | 11/2013 |
| CN | 201821365439.4 | 4/2019 |
| CN | 202020140664.9 | 11/2020 |

\* cited by examiner

*Primary Examiner* — Yvonne R Abbott-Lewis

(57) ABSTRACT

The present invention discloses an intelligent push-pull anti-cockroach automatic pet feeder, including a feeder main body, wherein the feeder main body includes a base, a driving device is arranged in the base, a base cover is arranged on the base, a grain barrel is arranged above the base cover, a grain barrel cover is arranged above the grain barrel, a grain conveying trough is formed in the base cover, a grain conveying push block is slidingly arranged in the grain conveying trough, a grain toggling sheet is arranged above the grain conveying push block, a grain outlet is formed at a front side of the base corresponding to the grain conveying trough, a grain leakage-preventing blocking sheet is arranged at a front end of the grain conveying push block, an anti-cockroach sealing strip is arranged at a front end of the grain conveying push block, the top of the driving device and the grain conveying push block are connected to each other, a feeding basin is arranged on the front side of the base corresponding to the lower part of the grain outlet, and during packaging, the grain barrel is placed above the feeding basin and the base is placed in the grain barrel. The intelligent push-pull anti-cockroach automatic pet feeder has a simple structure and can realize anti-insect and moisture-proof functions.

7 Claims, 6 Drawing Sheets

… (US 11,771,055 B2)

AUTOMATIC PET FEEDER WITH INTELLIGENT PUSH-PULL AND ANTI-COCKROACH FUNCTIONS

TECHNICAL FIELD

The present invention relates to a pet appliance, and in particular, to an intelligent push-pull anti-cockroach automatic pet feeder.

BACKGROUND

The Chinese Patent Application No. 202020140664.9 discloses a small pet automatic feeder, which includes a grain storage barrel, a machine main body, a grain dropping system arranged in the machine main body, and a pet feeding bowl, or further includes a cage hanging assembly for being connected to the machine main body; a grain leakage port of the grain storage barrel communicates with a grain inlet of the grain dropping system, and a grain outlet of the grain dropping system directly communicates with the pet feeding bowl or communicates with the pet feeding bowl through the cage hanging assembly.

The Chinese Patent Application No. 201320357788.2 discloses a pet feeder, including a shell, wherein the shell is provided with a food feeding port, the food feeding port is connected to a food outlet through a pipeline, a flat plate is arranged at a connection of the pipeline and the food outlet, the flat plate is connected to a spring and a tension and compression piece respectively, an electronic sounder is arranged in the shell, and the electronic sounder is connected to a control button on the shell.

The Chinese Patent Application No. 201821365439.4 discloses a pet feeder, including a feeder shell, a feeding bowl, a fresh-keeping cover, a single-chip information processing module and an infrared inductor, wherein the feeding bowl is arranged in the feeder shell, the infrared inductor is arranged at the front end of the feeder shell, the fresh-keeping cover covers the feeding bowl, the fresh-keeping cover is arranged in an openable manner on the feeder shell, and the infrared inductor is connected to the single-chip information processing module.

The above-mentioned inventions have complicated structures, are not easy to transport, are prone to grain jam, and have poor moisture-proof and insect-proof properties.

SUMMARY

An objective of the present invention is to overcome the defects in the inventions described in the preceding paragraphs, thus provide an intelligent push-pull anti-cockroach automatic pet feeder.

To achieve the above objective, the technical solution provided by the present invention is as follows: an intelligent push-pull anti-cockroach automatic pet feeder includes a feeder main body, wherein the feeder main body includes a base, a driving device is arranged in the base, a base cover is arranged on the base, a grain barrel is arranged above the base cover, a grain barrel cover is arranged above the grain barrel, a grain conveying trough is formed in the base cover, a grain conveying push block is slidingly arranged in the grain conveying trough, a grain toggling sheet is arranged above the grain conveying push block, a grain outlet is formed at a front side of the base corresponding to the grain conveying trough, a grain leakage-preventing blocking sheet is arranged at a front end of the grain conveying push block, an anti-cockroach sealing strip is arranged at a front end of the grain conveying push block, the top of the driving device and the grain conveying push block are connected to each other, a feeding basin is arranged on the front side of the base corresponding to the lower part of the grain outlet, and during packaging, the grain barrel is placed above the feeding basin and the base is placed in the grain barrel.

Further, the driving device includes a gear box, a motor is arranged in the gear box, a worm is arranged at an output end of the motor, the worm is connected to several speed-reducing gears, the speed-reducing gears are mutually engaged and connected, one speed-reducing gear extends and is exposed outside the gear box and is connected to a driving gear, a rack is movably connected above the gear box, the driving gear and the rack are engaged and connected, and the rack and the grain conveying push block are connected to each other.

Further, the rack is transversely provided with a first grain conveying push block position control point, a second grain conveying push block position control point and a third grain conveying push block position control point at intervals.

Further, an operation window is arranged on the front side of the base, the base is provided with a main control panel located inside the operation window, a cover plate is arranged on a front side of the main control panel, and a film button is arranged on a front side of the cover plate.

Further, an outer side of the grain outlet is connected to a feeding basin, and a stainless-steel basin is arranged in the feeding basin.

Further, the base is further provided with an infrared inductor located inside the grain outlet.

Further, a battery cavity is formed at the bottom of the base.

Further, the main control panel is electrically connected to the battery cavity, the driving device and the film button respectively.

Further, a foot pad is formed at the bottom of the base.

The present invention has the following beneficial effects: the intelligent push-pull anti-cockroach automatic pet feeder has a simple structure and achieves insect and moisture-proof functions; due to push-pull grain output, it has a small twisting force and thus is not stuck; and it can be stacked when not in use, saving space with its small size and reducing transportation costs.

DETAILED DESCRIPTION OF EMBODIMENTS

Figure 1:
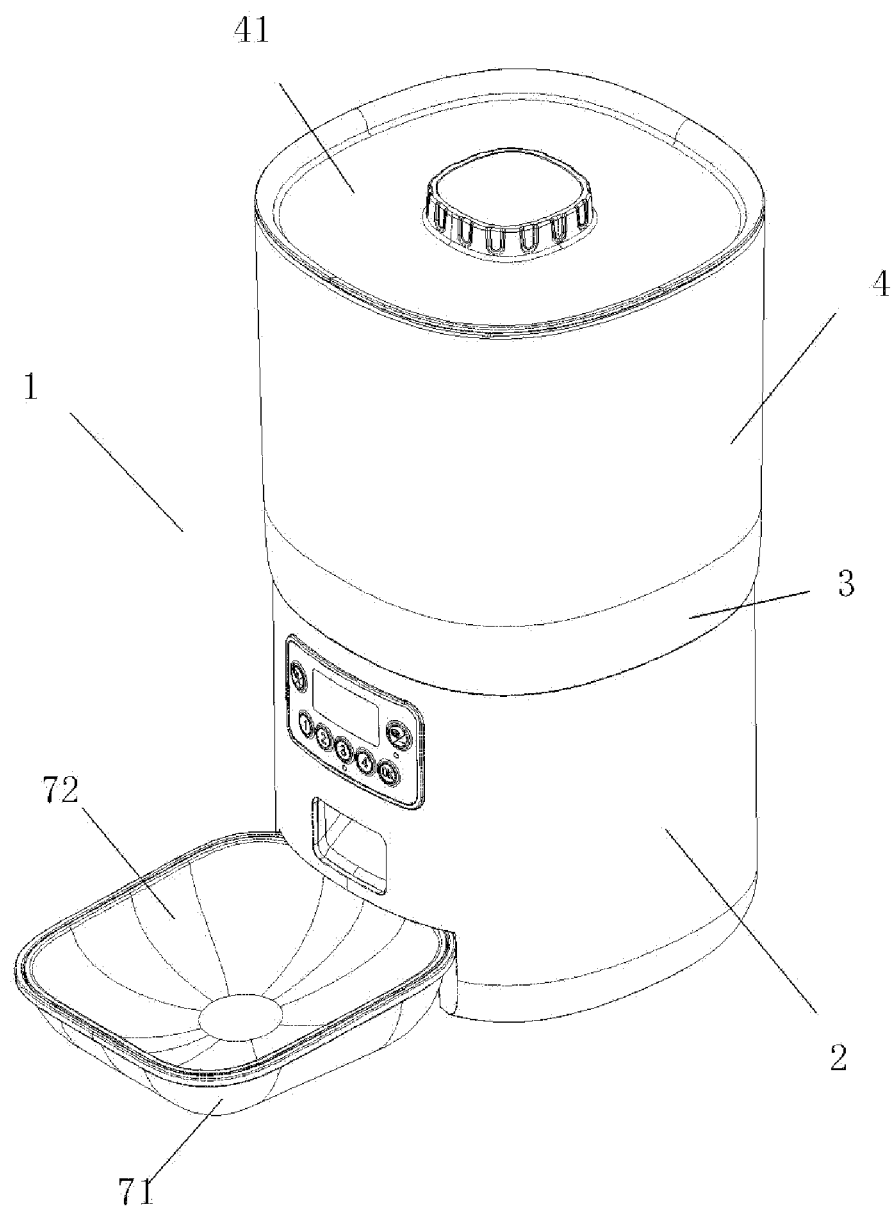
FIG. 1 shows a three-dimensional schematic diagram of an intelligent push-pull anti-cockroach automatic pet feeder according to the present invention.
Figure 2:
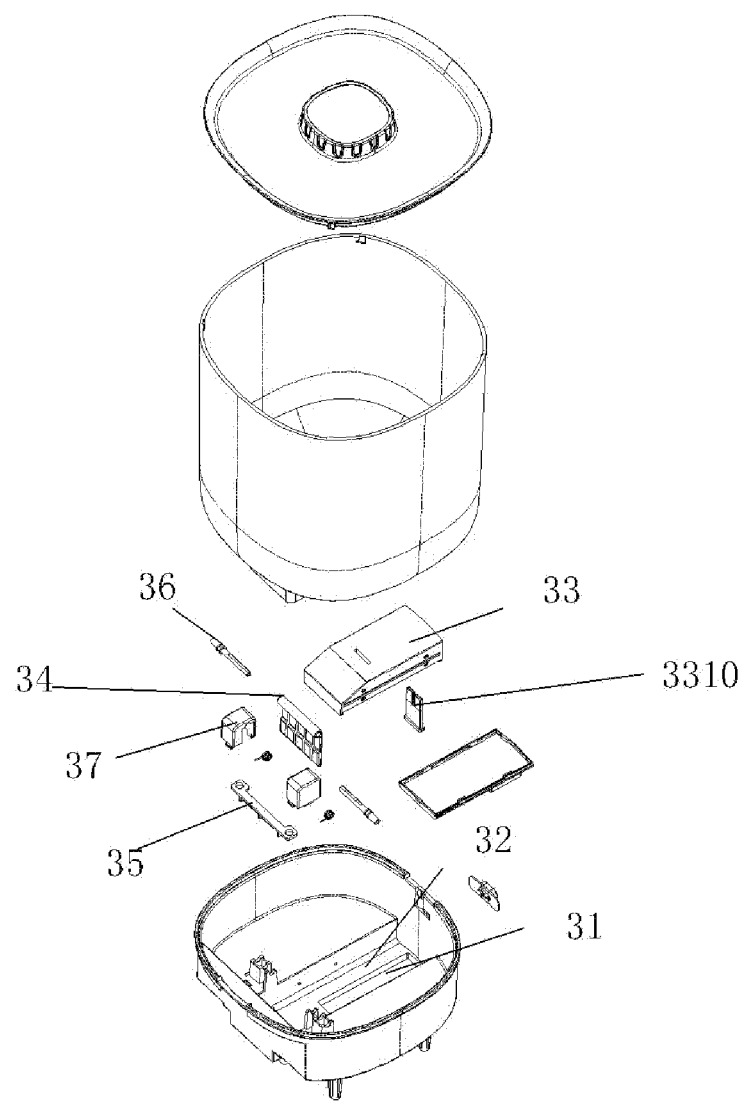
FIG. 2 shows a schematic exploded view of a base cover and a grain barrel in a first embodiment of an intelligent push-pull anti-cockroach automatic pet feeder according to the present invention.
Figure 3:
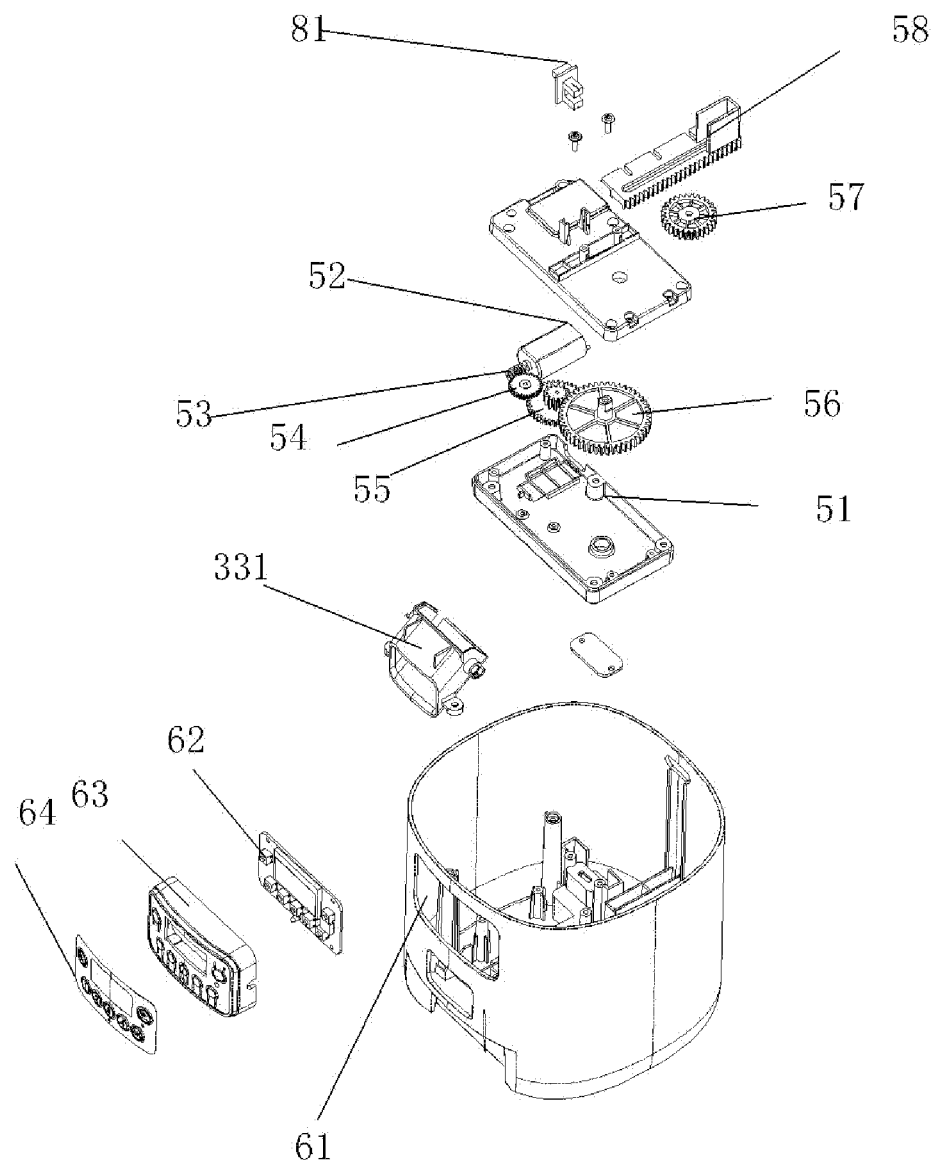
FIG. 3 shows a schematic exploded view of a base in a first embodiment of an intelligent push-pull anti-cockroach automatic pet feeder according to the present invention.
Figure 4:
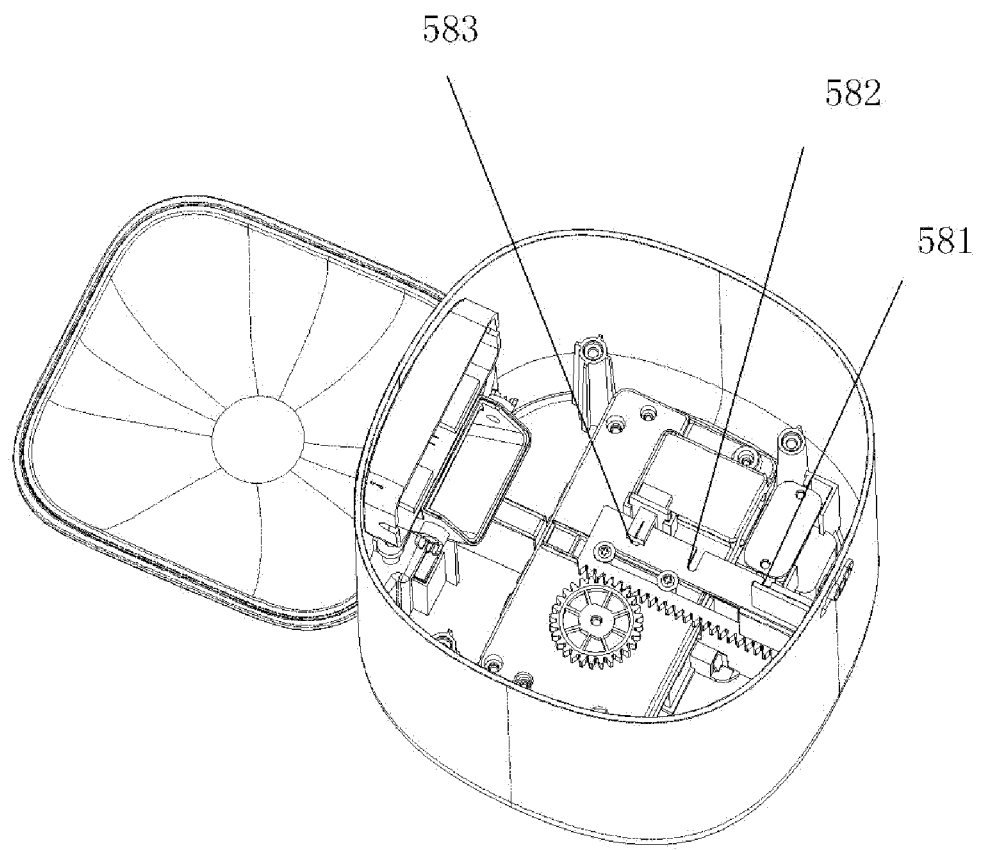
FIG. 4 shows a top view of an intelligent push-pull anti-cockroach automatic pet feeder according to the present invention.

The present invention is further described with reference to the accompanying drawings and preferred embodiments.

As shown in FIG. 1 to FIG. 4, an intelligent push-pull anti-cockroach automatic pet feeder provided by the present invention includes a feeder main body 1, wherein the feeder main body 1 includes a base 2, a driving device is arranged in the base 2, a base cover 3 is arranged on the base 2, a grain barrel 4 is arranged above the base 3, a grain barrel cover 41 is arranged above the grain barrel 4, a grain conveying trough 32 is formed in the base cover 3, a grain conveying push block 33 is slidingly arranged in the grain conveying trough 32, a grain toggling sheet 3310 is arranged above the grain conveying push block 33, a grain outlet 331 is formed at a front side of the base 2 corresponding to the grain conveying trough 32, a grain leakage-preventing blocking sheet 34 is arranged at a front end of the grain conveying push block 33, an anti-cockroach sealing strip 35 is arranged at a front end of the grain leakage-preventing blocking sheet 34, and the top of the driving device and the grain conveying push block 33 are connected to each other.

Further, the driving device includes a gear box 51, a motor 52 is arranged in the gear box 51, a worm 53 is arranged at an output end of the motor 52, the worm 53 is connected to a first speed-reducing gear 54, a side of the first speed-reducing gear 54 is engaged with a second speed-reducing gear 55, a side of the second speed-reducing gear 55 is engaged with a third speed-reducing gear 56, the top of the third speed-reducing gear 56 extends and is exposed outside the gear box 51 and is connected to a driving gear 57, a rack 58 is movably connected above the gear box 51, the driving gear 57 is engaged with and connected to the rack 58, and the rack 58 and the grain conveying push block 33 are connected to each other.

Further, the rack 58 is transversely provided with a first grain conveying push block position control point 581, a second grain conveying push block position control point 582 and a third grain conveying push block position control point 583 at intervals.

Further, an operation window 61 is arranged on the front side of the base 2, the base 2 is provided with a main control panel 62 located inside the operation window 61, a cover plate 63 is arranged on a front side of the main control panel 62, and a film button 64 is arranged on a front side of the cover plate 63.

Further, an outer side of the grain outlet 331 is connected to a feeding basin 71, and a stainless-steel basin 72 is arranged in the feeding basin 71.

Further, the base 2 is further provided with an infrared inductor 81 located inside the grain outlet 331.

Further, a battery cavity is formed at the bottom of the base 2.

Further, the main control panel 62 is electrically connected to the battery cavity, the driving device and the film button 64 respectively.

Further, a foot pad is formed at the bottom of the base 2.

Further, two sides of the grain leakage-preventing blocking sheet 34 are connected respectively through rotating shafts 36, and rotary spring covers 37 are arranged outside the rotating shafts 36 respectively.

As mention above, the intelligent push-pull anti-cockroach automatic pet feeder has a simple structure. Pet grain is placed in a grain barrel 4. Due to the infrared inductor 81, the first grain conveying push block position control point 581, the second grain conveying push block position control point 582 and the third grain conveying push block position control point 583, the first grain conveying push block position control point is a starting position, and the infrared inductor 81 controls the motor 52 to move the rack 58 at position of the first grain conveying push block position control point 581 when the intelligent push-pull anti-cockroach automatic pet feeder does not work. The rack 58 is connected to the grain conveying push block 33, at this time, the grain conveying push block 33 is closely attached to the anti-cockroach sealing strip 35, so cockroach and moisture enters the grain barrel 4 through the grain outlet 331. The base cover 3 is provided with the grain conveying trough 32, so the grain conveying push block 33 reciprocates in the grain conveying trough 32 to output grain. The second grain conveying push block position control point 582 and the third grain conveying push block position control point 583 are grain output motion control points. When grain is output, the infrared inductor 81 controls the motor 52 to rotate. When the rack 58 moves to the third grain conveying push block position control point 583, the grain in the grain barrel falls into the grain conveying trough 32, the motor 52 pushes the rack 58 to move to the second grain conveying push block position control point 582, and at this time, the grain is pushed to the grain outlet 331 through the grain conveying push block 33. Through the grain outlet 331, the grain will leak into the feeding basin 71. After the grain arrives at the second grain conveying push block position control point 582, the motor 52 moves the rack 58 to the third grain conveying push block position control point 583 to prepare for outputting a second part of grain, and after this action, the first part of grain is output. When the second part of grain is output, the infrared inductor 81 controls the motor 52 to move the rack 58 from the third grain conveying push block position control point 583 to the second grain conveying push block position control point 582 and then move back to the third grain conveying push block position control point 583 to prepare for outputting a third part of grain, and the process is repeated. The pause time of each control point conversion is set to 0.5 seconds. After the number of grains set by a user is finished, the infrared inductor 81 controls the motor 52 to move the rack 58 from the third grain conveying push block position control point 583 to the first grain conveying push block position control point 581. The grain conveying push block 33 and the anti-cockroach sealing strip 35 are closely attached to the grain outlet 331, the grain output work is all completed. When not in use, the grain barrel 4 may be placed in the feeding basin 71, and the base 2 may be placed in the grain barrel 4. Such superposition design can greatly shorten volume and facilitate transportation and carrying.

Figure 5:
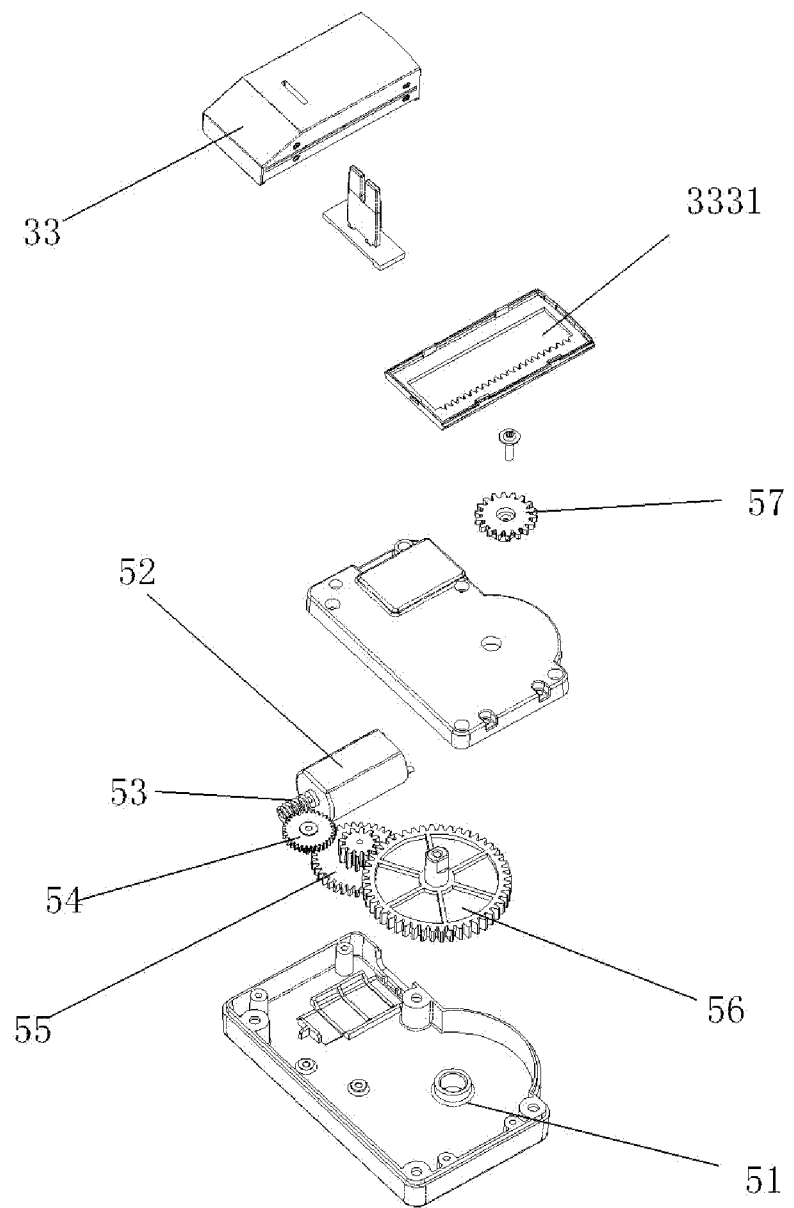
FIG. 5 shows a schematic exploded view of a driving device and a grain conveying push block in a second embodiment of an intelligent push-pull anti-cockroach automatic pet feeder according to the present invention.
Figure 6:
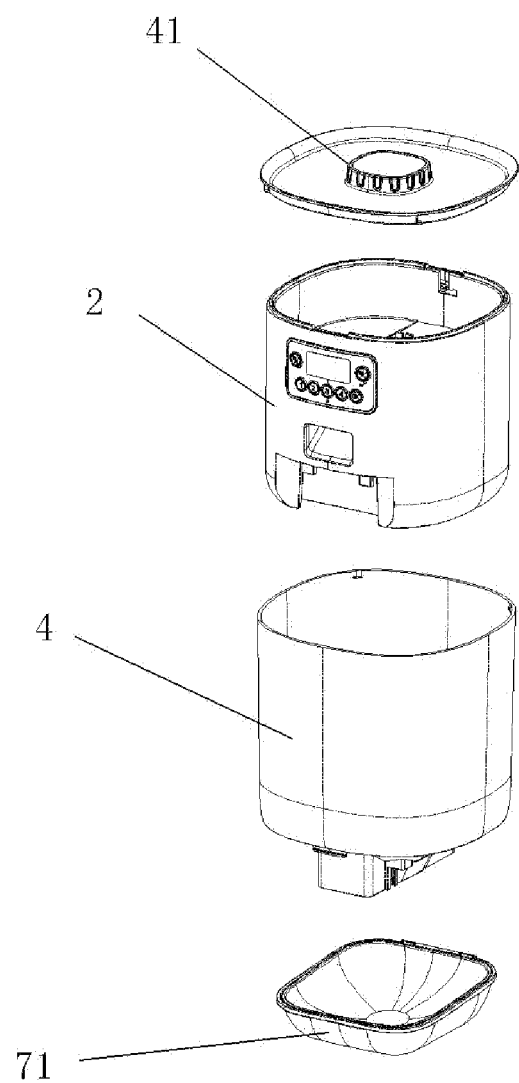
FIG. 6 shows a transportation and placement schematic diagram of an intelligent push-pull anti-cockroach automatic pet feeder according to the present invention.

Furthermore, as shown in FIG. 5, in the second embodiment of the present invention, the bottom of the grain conveying push block 33 is provided with meshing teeth 3311 along the sliding direction instead. The driving gear 57 is connected to the third speed-reducing gear 56 through a fixing screw, the motor 52 rotates, power output is subjected to speed reduction through the gear box 51 and then is transmitted to the driving gear 57, and the driving gear 57 drives the grain conveying push block 33 with the meshing teeth 3311 to reciprocate along the meshing teeth 3311 to push grain.

The above are merely the principle and preferred embodiments of the present invention. It should be pointed out that several variations and improvements can be made by those of ordinary skill in the art without departing from the principle of the present invention, and such variations and improvements should fall within the protection scope of the present invention.

What is claimed is:

1. An intelligent push-pull anti-cockroach automatic pet feeder, comprising a feeder main body, wherein the feeder main body comprises a base, a driving device is arranged in the base, a base cover is arranged on the base, a grain barrel is arranged above the base cover, a grain barrel cover is arranged above the grain barrel, a grain conveying trough is formed in the base cover, a grain conveying push block is slidingly arranged in the grain conveying trough, a grain toggling sheet is arranged above the grain conveying push block, a grain outlet is formed at a front side of the base corresponding to the grain conveying trough, a grain leakage-preventing blocking sheet is arranged at a front end of the grain conveying push block, an anti-cockroach sealing strip is arranged at a front end of the grain conveying push block, and the top of the driving device and the grain conveying push block are connected to each other.

2. The intelligent push-pull anti-cockroach automatic pet feeder according to claim 1, wherein the driving device comprises a gear box, a motor is arranged in the gear box, a worm is arranged at an output end of the motor, the worm is connected to several speed-reducing gears, the speed-reducing gears are mutually engaged and connected, one speed-reducing gear extends and is exposed outside the gear box and is connected to a driving gear, a rack is movably connected above the gear box, the driving gear and the rack are engaged and connected, and the rack and the grain conveying push block are connected to each other.

3. The intelligent push-pull anti-cockroach automatic pet feeder according to claim 1, wherein the rack is transversely provided with a first grain conveying push block position control point, a second grain conveying push block position control point and a third grain conveying push block position control point at intervals.

4. The intelligent push-pull anti-cockroach automatic pet feeder according to claim 1, wherein an operation window is arranged on the front side of the base, the base is provided with a main control panel located inside the operation window, a cover plate is arranged on a front side of the main control panel, and a film button is arranged on a front side of the cover plate.

5. The intelligent push-pull anti-cockroach automatic pet feeder according to claim 1, wherein an outer side of the grain outlet is connected to a feeding basin, and a stainless-steel basin is arranged in the feeding basin.

6. The intelligent push-pull anti-cockroach automatic pet feeder according to claim 1, wherein during package and transportation, the grain barrel is placed above the feeding basin, and the base is placed in the grain barrel.

7. The intelligent push-pull anti-cockroach automatic pet feeder according to claim 1, wherein the basin is further provided with an infrared inductor.

* * * * *